Oct. 12, 1965 J. P. SWEENEY 3,211,916
MAGNETIC CORE SWITCHING CIRCUIT
Filed April 4, 1961
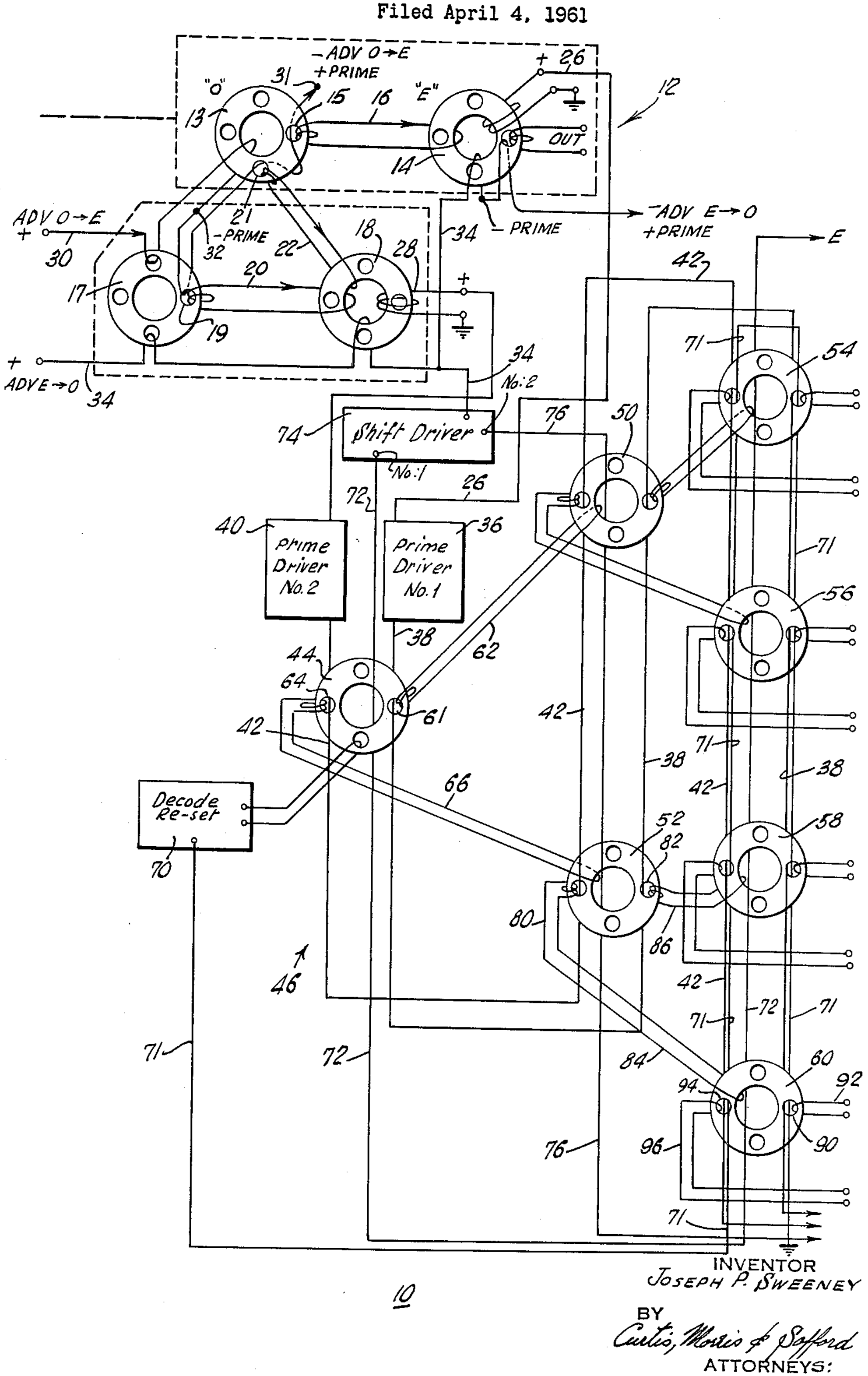
INVENTOR
JOSEPH P. SWEENEY
BY
Curtis, Morris & Safford
ATTORNEYS:

United States Patent Office 3,211,916

Patented Oct. 12, 1965

3,211,916

MAGNETIC CORE SWITCHING CIRCUIT

Joseph P. Sweeney, Harrisburg, Pa., assignor to AMP Incorporated, Harrisburg, Pa., a corporation of New Jersey Filed Apr. 4, 1961, Ser. No. 100,717

7 Claims. (Cl. 307—88)

This invention relates to an electrical circuit for handling binary signals, and more particularly to such a circuit using multi-aperture magnetic cores as its principal elements.

An object of this invention is to provide an improved magnetic core circuit which can accept a series of binary pulses representing a number, and in response thereto select one load or output from among many, the particular load selected corresponding to the number represented by the series of pulses.

Another object is to provide such a circuit which is simple and inexpensive and yet efficient and reliable.

These and other objects will in part be understood from and in part pointed out in the following description.

In binary arithmetic each digit can be only a "zero" or a "one." Thus, for example, the decimal number 8 can be represented by the three binary digits 100. Now, the electrical equivalent of a binary "one" can be the presence of a signal, for example, a voltage, while for a binary zero there would be no signal. The ease with which such signals can be manipulated and remembered with presently available electrical circuits, in large part accounts for the present popularity of equipment using binary techniques.

In many areas of computer logic, for example, it is desirable to obtain along with a given binary number its binary complement. The complement of a binary one is a zero, and of a binary zero, a one.

The inventor's co-pending application, U.S. Serial No. 9,282, February 17, 1960 and now Patent #2,995,731 (123231) discloses a superior shift register for binary numbers using an assembly of multi-aperture magnetic cores. For each binary digit there is a pair of magnetic cores, one of which "remembers" the digit (zero or one) in accordance with whether or not the core is saturated with flux in the clockwise or counter-clockwise direction. Thus, a sequence of digits (e.g. 100) can be handled by an assembly of such cores connected together in series. These digits can then be shifted out of the register one-by-one in their proper sequence to "read out" the binary number. The present invention provides an overall load selecting arrangement which includes as an integral part a shift register of this kind so that a binary number in the register can be used to select any given output from among many.

In accordance with the invention, in one specific embodiment thereof, a shift register, such as described in the aforesaid co-pending application, is connected by means of a unique binary complementer and several auxiliary pulse drivers to a de-coding or load selecting network. These elements function in unison so that using the normal sequence of energization or clock cycle of the shift register a series of binary digits serially advanced into the register will select one output from among many, depending upon the decimal number represented by the series of binary digits. Thus, in one sense, this arrangement serves as a binary-to-decimal code converter. This arrangement can also be employed as a load selector. Among the advantages of this circuit are its compatibility with existing equipment, and its simplicity and reliabilty.

A better understanding of the invention together with a fuller appreciation of its many advantages will best be gained from the following description given in connection with the accompanying drawings, the single of which shows a circuit 10 embodying features of the invention.

Circuit 10 at its upper left includes a shift register, generally indicated at 12, of the kind described in the said co-pending application. For simplicity here, only the last two cores of the register are shown, namely O core 13 and E core 14. Each of these cores, and also every other core of circuit 10, has a large central or major aperture and four minor apertures through the body of the core at equally spaced points. It should be noted that some or all of the minor apertures of a particular core may not be used, but they are nonetheless shown to make clear that all of the cores of this circuit can be identical, if desired for manufacturing convenience. These cores are about the size of a small shirt button and are made of square-loop magnetic material, preferably ferrite.

O core 13 is connected through a minor output aperture 15 by means of a coupling winding 16 to E core 14. Beneath O core 13 is a first auxiliary core 17 to the right of which is a second auxiliary core 18. Core 17 is coupled through a minor output aperture 19 to core 18 by a coupling winding 20. Similarly O core 13 is connected through another of its minor output apertures, aperture 21, by means of a coupling winding 22 to auxiliary core 18. As will be explained in the following, when a binary one is set into E core 14, a zero is set into core 18. Under these conditions a signal (indicating a one) will appear at the output winding 26 of E core 14, and no signal (indicating a zero) will appear at the output winding 28 of auxiliary core 18. On the other hand, when a zero is transmitted from core 13 to core 14, a one will be set into core 18. Then there will be no signal on winding 26 and a signal on winding 28. In either case, the signal, or lack of it, on winding 28 is the complement of the signal at winding 26.

As is understood by those skilled in the art, a zero may be stored in a core by saturating it with magnetic flux in the clockwise direction, and a one stored by reversing part (i.e. half) of the clockwise flux leaving the core saturated with flux, part in one direction, and the remainder in the other.

To return the odd cores of register 12, including O core 13, to a zero or "clear" condition wherein all of the flux in each core is in the clockwise direction, the odd cores are threaded with an advance O to E winding 30. When a suitable current pulse is applied to this winding in the sense indicated, each O core will be saturated with flux in the clockwise direction. Assuming that O core 13 had been thus "cleared," and that now it is set with a one (by a signal from the preceding core in the register), there will result a clockwise circulating flux path locally around each minor aperture. Now, by the application of a direct prime current to that portion of winding 30 threading the minor apertures of the cores, namely the portion between terminal points 31 and 32, the flux locally set around minor aperture 15 is reversed so that it now circulates in the counterclockwise direction. Thereafter, when the core is cleared, the flux in the outer leg of the core at aperture 15 will be reversed and will generate a signal current (indicative of the one previously stored in the core) in coupling winding 16. This signal, because of the winding sense of winding 16, will set a one in E core 14. The above action of priming and advancing is well known to those skilled in the art.

It will be noted that output minor aperture 21 of O core 13 is also threaded by the priming portion of winding 30 so that flux set therearound is simultaneously primed when the flux around aperture 15 is primed. Thus, simultaneously with the occurrence of a signal in winding 16, there will occur a signal in winding 22. But this winding is coupled to core 18 in a sense so that the signal tends to clear the core, rather than set a one.

Assuming that a zero were stored in O core 13, then on the occurrence of an advance O to E drive current pulse on winding 30, no signal current would circulate in winding 16, and similarly, no signal current in winding 22. E core 14, therefore, will remain in the clear or zero state, to which it has previously been driven by an advance E to O current pulse applied to a winding 34 threading the major aperture of E core 14. This winding 34 also threads auxiliary core 18 in the "clear" sense and threads auxiliary core 17 in the "set" sense. Thus upon the occurrence of an advance E to O pulse, auxiliary core 17 will be set with a one and cores 14 and 18 will be cleared. Winding 30 also threads core 17, but in the clear sense, therefore, an advance O to E current pulse will transfer a one from core 17 into core 18 via winding 20. Under the conditions noted above, where there is also a signal current in winding 22, the current in coupling winding 20 tending to set a one is opposed and cancelled and, therefore, a zero is set into core 18. If there had been no current in winding 22, the current in winding 20 would not have been opposed and a one would be set into core 18 from core 17. Thus, whenever E core 14 is set with a one, auxiliary core 18 is set with a zero, and whenever E core 14 is set with a zero, auxiliary core 18 is set with a one. Since output winding 26 on E core 14 threads the major aperture of the core, when a one is set into the core, a positive signal is simultaneously generated in winding 26. Similarly, when a one is set into core 18 there will be a positive signal on its output winding 28. Thus, with each advance O to E drive current, there will occur a positive signal current either on winding 26 or winding 28, but not both. Of course, when cores 14 and 18 are cleared by an advance E to O pulse, a reverse signal will be generated in winding 26 or winding 28, but this signal is opposite in polarity to the positive signal appearing in one of these windings with the previous advance O to E pulse.

Output winding 26 is connected to a first drive unit 36, which when a positive signal is applied to it produces on its output lead 38 a current which serves to prime the minor apertures of the cores threaded by this lead. Similarly, output winding 28 is connected to a second drive unit 40, which when actuated by a positive signal applies to its output lead 42 a current which primes the minor apertures threaded by this lead. Units 36 and 40 are not responsive to negative signals; they may be any suitable current pulse source, many of which are known in the art, hence these units will not be described in detail.

Positioned on the drawing beneath drivers 36 and 40 is core 44 which comprises the first column of cores in a decoding "tree" or load selecting arrangement generally indicated at 46. The arrangement shown has three columns, the first comprising core 44, the next, the two cores 50 and 52, and the last column, the four cores 54, 56, 58 and 60. Additional columns of cores can be employed to decode a longer sequence of binary signals, but these cores have not been shown because they are not necessary to an understanding of the invention.

Core 44 through its right minor aperture 61 is coupled via a winding 62 to core 50, and through its left minor aperture 64 is coupled via a winding 66 to core 52. Core 44 is further connected to a pulse source 70 which can be manually actuated to initially set a one into the core or which in the circuit shown is reset automatically by a positive or negative signal on a winding 71 connected to it. Winding 71 threads the minor output apertures of the cores in the last column, the winding threading these apertures in opposite senses as shown to cancel out noise. Assuming that a one has been set into this core, this will cause the setting up of flux circulating locally in the clockwise direction around minor apertures 61 and 64. Now it will be noted that these apertures are threaded, respectively, by leads 38 and 42 from prime drivers 36 and 40. Thus, depending upon which of these drivers is actuated when an advance O to E drive current is applied to shift register 12, the flux set locally around aperture 61 or around aperture 64 (but not both) is reversed or primed. Thereafter, when the core is returned to the clear state, a signal will be generated in coupling winding 62 or in winding 66, depending upon which minor aperture was primed, thus leads 38 and 42 operate as information steering windings by a selective timing operation.

Core 44 is returned to the clear state by a suitable drive current pulse applied to a lead 72 threading the major aperture of this core, and also of all the cores in the third column, and succeeding odd numbered columns, if any. This lead 72 is connected to the first output terminal (No. 1) of a shift driver 74 which in turn is actuated by pulses from advance E to O winding 34. This driver has a second output terminal (No. 2) connected to a lead 76 which threads the major apertures of the cores in the second column, and succeeding even numbered columns, if any. When a first pulse appears on the advance E to O winding, driver 74 is triggered on and applied to lead 72 a current which clears the cores threaded by it. When the next advance E to O pulse appears, driver 74 switches to its second output and applies a clear current to lead 76, then back again as succeeding advance E to O pulses appear. Driver 74 may be any suitable one known in the art.

At the beginning of read-out of the binary digits stored in shift-register 12, a one is set into core 44. Now, let us assume that the last advance O to E pulse left a zero in E core 14, and a one in auxiliary core 18 so that as a consequence minor aperture 64 of core 44 is primed, while minor aperture 61 is not. Also assume that when the next advance E to O pulse is applied to winding 34, driver 74 energizes its No. 1 output and lead 72 thereby clearing core 44. This, since a one had previously been set in the core, will generate a current in coupling winding 66 (but not in winding 62) thereby setting core 52, while core 50 in the same column will remain unset or cleared. On the next cycle assume another zero appears in E core 14. Then again driver 40 will be triggered on and by energizing lead 42 will prime the flux set locally around the left-hand minor aperture 80 of core 52. Of all of the cores in decoder 46, only core 52 is presently set with a one and hence its minor aperture 80, which is threaded by lead 42, is the only one around which flux will be reversed. The right-hand minor aperture 82 of core 52, though having a locally clockwise circulating flux because of the one now set in this core, will not be primed because lead 38 is not now energized. When the next advance E to O pulse occurs on lead 34, output No. 2 of driver 74 and lead 76 will be energized and this will clear core 52. Since aperture 80 had been primed, current will be generated in the coupling loop 84 encircling aperture 80 and the main aperture of core 60 in the third column. This will set a one into core 60. However, since aperture 82 was not primed, even though flux was set locally around it, when core 52 is cleared no current will be generated in the coupling loop 86 threading aperture 82 and core 58. Thus the latter core, as well as cores 54 and 56 in the third column will remain in the clear or unset state.

If the next digit read out of shift register 12 happens to be a one, then prime driver 36 will be triggered on, thereby energizing lead 38 and priming the right-hand aperture 90 of core 60. It should be remembered that though lead 38 also threads the right-hand minor apertures of the other cores in decoder 46, none of these cores is presently set with a one.

With the next advance E to O pulse, output No. 1 of driver 74 is again energized and then the flux previously primed around minor aperture 90 of core 60 is cleared. This generates a current in the output winding 92. The left-hand minor aperture 94 of core 60 is threaded with an output winding 96, but since this aperture was not primed no current will be generated in winding 96 when the core is cleared. Since no flux was set in any other core in the third column, no current will be generated in the output windings respectively threading their left and right minor apertures. When a signal is generated in any of the output windings, e.g., winding 92, a signal will be generated in lead 71 thereby automatically operating pulse source 70 and setting a one into core 44. This prepares the decoder for the next read-out operation.

The digits 0, 0, 1 have now been read out of shift register 12 with the result that winding 92, and only winding 92 of the eight such windings in the third column of cores of decoder 46, was energized. This winding thus corresponds to the decimal number 8 represented by the binary number 100. In this circuit there is a column of cores in decoder 46 for each digit in the binary number to be read out of shift register 12. To accommodate a four-digit binary number, another column of cores with sixteen output windings would be added, and so on.

It will now be understood that decoder 46 operates in unison with shift register 12. The output of the shift register and of auxiliary core 18 directly control the selective shifting of a binary one from either the right-hand or left-hand minor aperture of a core in one column of the decoder, to a core in the next column. The time of shifting in the decoder is locked to the clock cycle of the shift register. Thus, as fast as information is read out of the shift register, it is fed into the decoder and routed or steered by the energization of windings 38 or 42, without the loss of a single clock cycle, to a selected one of its output windings. The permissible sizes of the various currents in the decoder and its temperature range of operation are essentially the same as for the shift register itself, hence circuit 10 functions as a harmonious entity. Since only a single core is decoded 46 is ever set at any given instant, drivers 36, 40 and 74 see a constant load. The single one set into decoder 46 at the beginning of the read-out operation is, as was previously mentioned, derived from source 70.

The above description is intended in illustration and not in limitation of the invention. Various changes may occur to those skilled in the art and these may be made without departing from the spirit or scope of the invention as set forth.

I claim:

1. A magnetic circuit for accepting binary signals and in response thereto for selecting one output from among many, said circuit including a magnetic core shift register having a plurality of magnetic cores, said register having at least two drive windings which are energized in sequence during a clock cycle to shift information from one core to the next in said register, a decoder comprising a plurality of magnetic cores arranged in columns with each core in a column being connected to transmit information to a plurality of cores in the next column, first and second drive means coupling respectively the cores in odd and even columns, said drive means being energized in sequence from one shift register drive winding to shift information from column to column in said decoder, and means to permit the selective shift of information from one core in the next column, said means being actuated in accordance with whether a one or zero is read out of said shift register on each clock cycle.

2. The circuit in claim 1 wherein the cores in said decoder each have a first and a second minor output aperture, each of said minor apertures of a core in one column being coupled to a single core respectively in the next column, and said means to permit the selective shift of information including a first priming means for said first minor output apertures and a second priming means for said second minor output apertures, said first priming means being actuated when a one is read out of said shift register and said second priming means being actuated when a zero is read out of said shift register.

3. The circuit in claim 2 wherein said first priming means is actuated directly from said shift register, and complementing means connected to said shift register for obtaining the complements of signals therefrom, said complementing means actuating said second priming means.

4. A magnetic core circuit for selecting a particular output or load in accordance with a coded sequence of pulses, said circuit including a plurality of magnetic cores arranged as a shift register, register shift means to shift magnetic flux representing binary intelligence in the form of one or zero from one core to the next through said cores including a first advance winding and a second advance winding, a decoding network including a plurality of columns of magnetic cores, a core in one column having two outputs each of which is coupled to a single core respectively in the next column, and network shift means to selectively shift magnetic flux from a core in one column to a selected core in the next column in accordance with said sequence of pulses, said network shift means including a first driver, and a second driver actuated in sequence by one of said advance windings to return all of the cores in odd and then even numbered columns of said network to clear condition, and enabling means to permit transfer of flux from a chosen one of said two outputs of said cores in said network, said enabling means being controlled by said shift register in accordance with whether a one or zero is read therefrom on each clock cycle.

5. An information input and drive arrangement for a decoder which includes a plurality of magnetic cores, a first and a second clearing winding and a first and a second steering winding, said arrangement comprising a first magnetic core, a second magnetic core and an auxiliary magnetic core, said second and auxiliary cores being connected to the first to receive flux transmitted therefrom, a first drive winding threading said first core to return it to clear condition, a second drive winding threading said second and auxiliary cores to return them to clear condition, first driver means actuated by said second drive winding to actuate the first and second clearing windings of said decoder, and second driver means connected respectively to said second and auxiliary cores to actuate the first and second steering windings of said decoder to steer information therethrough in a controlled manner.

6. The circuit in claim 5 in further combination with a one-setting drive unit to set a single one into said decoder at the beginning of a decoding operation.

7. The circuit in claim 6 wherein said one-setting drive unit is actuated automatically by a winding connected to the outputs of said decoder.

References Cited by the Examiner

UNITED STATES PATENTS

| | | | |
|---|---|---|---|
| 2,963,687 | 12/60 | Briggs | 340—174 |
| 2,968,795 | 1/61 | Briggs | 340—174 |
| 2,992,421 | 7/61 | Whitney | 340—347 |

OTHER REFERENCES

Publication I: Sequential Decoding, by John M. Wozencraft and Barney Reiffen, published jointly by The Technology Press of the Massachusetts Institute of Technology and John Wiley and Sons, Inc., reference particularly made to pages 52–55, copyright 1961.

IRVING L. SRAGOW, *Primary Examiner.*

JOHN BURNS, *Examiner.*